United States Patent
Cai et al.

(10) Patent No.: US 8,831,560 B2
(45) Date of Patent: Sep. 9, 2014

(54) CHARGING METHOD SELECTION FOR SERVICE DATA FLOWS BASED ON THE DATA SERVICES BEING REQUESTED

(75) Inventors: Yigang Cai, Naperville, IL (US); Kim Brouard, Velizy Villacoublay (FR)

(73) Assignee: Alcatel Lucent, Boulogne Billancourt (FR)

( * ) Notice: Subject to any disclaimer, the term of this patent is extended or adjusted under 35 U.S.C. 154(b) by 550 days.

(21) Appl. No.: 12/772,851

(22) Filed: May 3, 2010

(65) Prior Publication Data
US 2011/0270722 A1    Nov. 3, 2011

(51) Int. Cl.
*G06Q 10/00* (2012.01)
*G06Q 30/00* (2012.01)
*G06Q 50/00* (2012.01)
*G06Q 30/04* (2012.01)
*H04L 29/06* (2006.01)
*G06Q 30/02* (2012.01)
*H04L 12/14* (2006.01)

(52) U.S. Cl.
CPC ............ *H04L 65/4076* (2013.01); *G06Q 30/04* (2013.01); *G06Q 30/0283* (2013.01); *H04L 65/1016* (2013.01); *H04L 12/1467* (2013.01); *H04L 12/1457* (2013.01); *H04L 12/1425* (2013.01); *H04L 12/1485* (2013.01); *H04L 12/1471* (2013.01)
USPC ............................... 455/406; 705/34; 705/400

(58) Field of Classification Search
USPC ........................ 455/406–408; 705/30–44, 400
See application file for complete search history.

(56) References Cited

U.S. PATENT DOCUMENTS

2007/0124160 A1*  5/2007  Duan et al. .......................... 705/1
2010/0010922 A1*  1/2010  Foottit et al. ..................... 705/30
2010/0174630 A1*  7/2010  Shan et al. ....................... 705/34

FOREIGN PATENT DOCUMENTS

| EP | 1746772 A1 | 1/2007 |
| WO | WO2008080347 A1 | 7/2008 |
| WO | WO 2009062442 A1 * | 5/2009 |
| WO | WO 2011101063 A1 * | 8/2011 |
| WO | WO 2011101066 A1 * | 8/2011 |

OTHER PUBLICATIONS

"3rd Generation Partnership Project; Technical Specification Group Services and System Aspects; Policy and Charging control architecture (Release 9)", 3GPP Standard; 3GPP TS 23.203, 3rd Generation Partnership Project (3GPP), Mobile Competence Centre; 650, Route Des Lucioles; F-06921 Sophia-Antipolis Cedex; France, No. V9.4.0, Mar. 25, 2010, pp. 1-123, XP050402048.

(Continued)

*Primary Examiner* — Kashif Siddiqui
(74) *Attorney, Agent, or Firm* — Duft, Bornsen & Fettig, LLP

(57) ABSTRACT

Systems and methods are disclosed for performing Policy and Charging Control (PCC) for packet core networks. One embodiment comprises a PCC architecture that includes an online charging system (OCS). The OCS receives a request for charging rules for an initial data service from a PCRF. The request from the PCRF includes a service indicator for the initial data service. The OCS selects a charging method for the initial data service based on the service indicator, and transmits a response to the PCRF that includes the selected charging method. The PCRF may then make a PCC decision based on the charging method selected by the OCS, and a PCEF may enforce PCC rules for the initial data service. If there is a service changing during a data session, the OCS selects a charging method for the new data service, and the PCRF updates the PCC rules accordingly.

18 Claims, 12 Drawing Sheets

(56) References Cited

OTHER PUBLICATIONS

R. Huhne: "Architecture for a service oriented and convergent charging in 3G Mobile networks and beyond", 6th IEE International Conference on 3G and Beyond (05/11182), vol. 2005, Jan. 1, 2005, pp. 517-521, XP 55001530, DOI: 10.1049/cp: 20050275.

"TS 29.212 V8.4.0 3rd Generation Partnership Project; Technical Specification Group Core Network and Terminals; Policy and Charging Control over Gx reference point (Release 8)" 3GPP, May 2009.

"TS 23.203 V9.0.0 3rd Generation Partnership Project; Technical Specification Group Services and System Aspects; Policy and charging control architecture (Release 9)," 3GPP Mar. 3, 2009.

* cited by examiner

CHARGING METHOD SELECTION FOR SERVICE DATA FLOWS BASED ON THE DATA SERVICES BEING REQUESTED

FIELD OF THE INVENTION

The invention is related to the field of communication networks and, in particular, to selecting charging methods (e.g., online/offline) for service data flows based on the services that are requested.

BACKGROUND

Service providers typically provide numerous voice and data services to subscribers. Examples of voice services are voice calls, call forwarding, call waiting, etc. Examples of data services are streaming audio, streaming video, Voice over IP (VoIP), online gaming, and IP-TV. The data services are managed by a packet core network, which interfaces the subscriber with external packet networks such as the internet. Some examples of packet core networks are a GPRS core network, an Evolved Packet Core (EPC) network, etc. A subscriber uses a mobile device, such as a cell phone, a personal data assistant, a smart phone, etc, to connect with a Radio Access Network (RAN). The RAN may be a packet-based network that provides IP connectivity, which is also referred to as an IP Connectivity Access Network (CAN). The RAN in turn connects to the packet core network in order to provide the subscriber with access to the data services.

To access a data service, the mobile device transmits a request to initiate a data session (e.g., an IP-CAN session) to the packet core network via the RAN. The session request includes a description of the requested data service (e.g., online gaming, IP-TV, etc). The packet core network authenticates the mobile device and determines which data services the mobile device is authorized to receive. If the requested service is authorized, the packet core network reserves a bearer path (e.g., an IP CAN bearer) of a defined capacity, delay, and bit error rate. A flow of packets may then begin for the service, which is referred to as a service data flow.

Service providers desire to control how the RAN is used in providing the data services. Thus, the service providers typically implement Policy and Charging Control (PCC). Policy control refers to the process of controlling the bearer path for the service data flow. For example, policy control includes bearer establishment, Quality of Service (QoS) control, and gating control (blocking or allowing packets to pass). Charging control refers to the process of associating packets of the service data flow to a charging key or identifier, and applying online charging and/or offline charging as appropriate. The service providers define PCC rules that may be used for data services that are requested by its subscribers.

The 3rd Generation Partnership Project (3GPP, 3GPP2) has defined a PCC architecture for packet core networks. One example of a PCC architecture is described in 3GPP TS 23.203 (Release 9). The PCC architecture suggested by the 3GPP includes a Policy and Charging Rules Function (PCRF), a gateway (e.g., a GGSN or packet data gateway) comprising a Policy and Charging Enforcement Function (PCEF), an application function (AF), a Bearer Binding and Event Reporting Function (BBERF), a Subscription Profile Repository (SPR), an Online Charging System (OCS) comprising a Service Data Flow based Credit Control (SDFBCC) function, and an Offline Charging System (OFCS). As a brief description of some of the elements of the PCC architecture, the PCRF makes policy control decisions and flow-based charging control decisions to select which PCC rules to implement for a service data flow. The PCEF in the gateway provides service data flow detection, user plane traffic handling, QoS handling, service data flow measurement, and online/offline charging interactions. The SPR stores subscriber data and subscription related information, such as in a subscriber profile. The SDFBCC performs online credit control functions within the OCS, such as reserving credit, granting quotas, etc.

The 3GPP standards also describe how PCC rules are selected in the PCC architectures. The standards suggest that PCC rules are selected in the PCRF based largely on subscriber-related data, such as the data stored in the SPC. It may be desirable to select PCC rules in a different manner.

SUMMARY

Embodiments described herein allow for selection of charging rules, and more particularly selection of a charging method (e.g., online/offline), based on information related to the data service. In these embodiments, the OCS is able to select a charging method based on a service indicator. The OCS stores charging account data for end users, including service-related tariff plans. When the OCS receives a service indicator for a data service, the OCS is able to associate the service indicator with a tariff plan, and associate the tariff plan with a charging method. Thus, the OCS can dynamically select a charging method for the requested data service based on the service indicator. The charging method and other charging rules are selected based on the data service being requested instead of just subscriber-related data. This provides more flexibility in how charging is performed for service data flows. For example, online gaming may be charged to a postpaid account of an end user, while VoIP calls may be charged to a prepaid account of the end user's employer. In this example, the charging method is selected based on the service being accessed by the end user instead of just a subscriber ID.

One embodiment comprises a Policy and Charging Control (PCC) architecture. The PCC architecture includes an OCS operable to receive a request for charging rules for an initial data service from a Policy and Charging Rules Function (PCRF). The request from the PCRF includes a service indicator for the initial data service. The OCS is further operable to select a charging method for the initial data service based on the service indicator, and to transmit a response to the PCRF that includes the charging method for the initial data service. The PCRF may then make a PCC decision based on the charging method selected by the OCS, and a Policy and Charging Enforcement Function (PCEF) may enforce PCC rules for the initial data service.

In another embodiment, the OCS is further operable to receive a request for updated charging rules from the PCRF responsive to a service change. For example, an end user may request a change from the initial data service to a new data service during the existing data session. The request from the PCRF includes a service indicator for the new data service. The OCS is further operable to select a charging method for the new data service based on the service indicator, and to transmit a response to the PCRF that includes the charging method for the new data service. The PCRF may then determine updated PCC rules based on the charging method for the new data service, and the PCEF may enforce the updated PCC rules for the new data service.

In yet another embodiment, the OCS is further operable to receive a charging request from the PCEF responsive to a service change. The charging request (e.g., Diameter CCR) includes a service indicator for a new data service. The OCS is further operable to select a charging method for the new data service based on the service indicator, and to transmit a request to the PCRF that includes the charging method for the new data service. The request forces the PCRF to update the PCC rules based on the charging method for the new data service.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
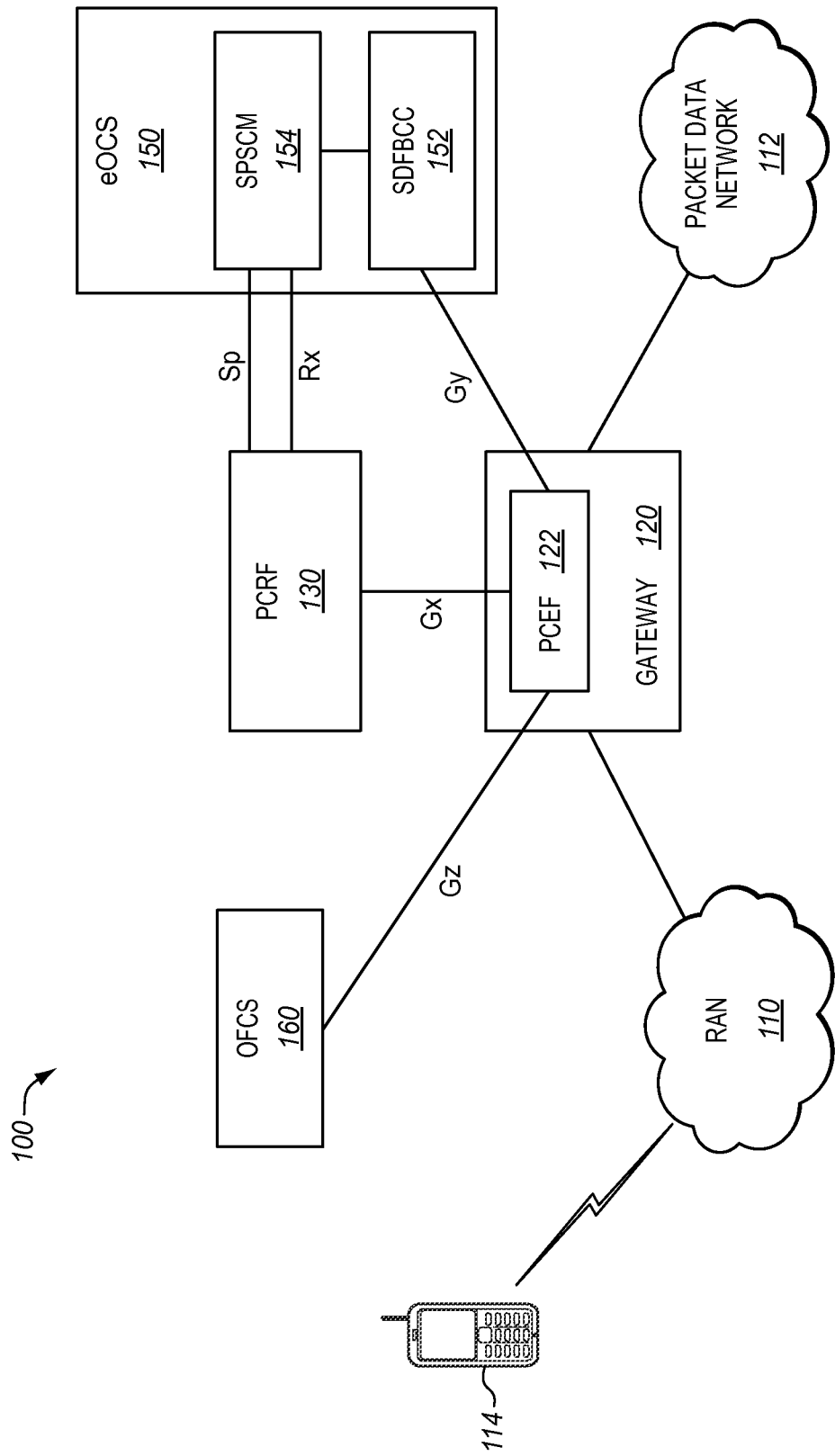
FIG. 1 illustrates a Policy and Charging Control (PCC) architecture for a packet core network in an exemplary embodiment.

FIG. 1 illustrates a PCC architecture 100 for a packet core network in an exemplary embodiment. The PCC architecture 100 may be used in a Long Term Evolution/Evolved Packet Core (LTE/EPC) network. PCC architecture 100 includes a gateway 120 implemented between a Radio Access Network (RAN) 110 and one or more external packet data networks 112. Examples of gateway 120 include a GGSN in a GPRS network or a packet data gateway (P-GW) in an EPC network. Gateway 120 includes a Policy and Charging Enforcement Function (PCEF) 122 that provides service data flow detection, user plane traffic handling, QoS handling, service data flow measurement, and online/offline charging interactions. PCC architecture 100 further includes a Policy and Charging Rules Function (PCRF) 130, which is operable to decide which PCC rules to implement for a service data flow. PCC architecture 100 further includes an Online Charging System (OCS) 150 and an Offline Charging System (OFCS) 160.

OCS 150 in this embodiment is extended as compared to the 3GPP standards, and is thus may be referred to as an extended OCS (eOCS). OCS 150 includes a Service Data Flow based Credit Control (SDFCC) function 152, which is operable to perform online credit control functions within OCS 150, such as reserving credit, granting quotas, etc. OCS 150 further includes a Subscriber Profile and Service Control Management (SPSCM) function 154. SPSCM function 154 is operable to store subscriber-related data, such as a subscriber profile. This data is similar to the data stored in an SPR. SPSCM function 154 is further operable to store subscriber account data, service-based tariffs, and other charging data for subscribers. Through this data, SPSCM function 154 is able to select charging methods and other charging rules based on service indicators.

PCEF 122 connects with PCRF 130 over a Gx reference point. PCRF 130 connects with SPSCM 154 over an Sp reference point and an Rx reference point. PCEF 122 connects with SDFCC 152 over a Gy reference point, and connects with OFCS 160 over a Gz reference point.

Figure 2:
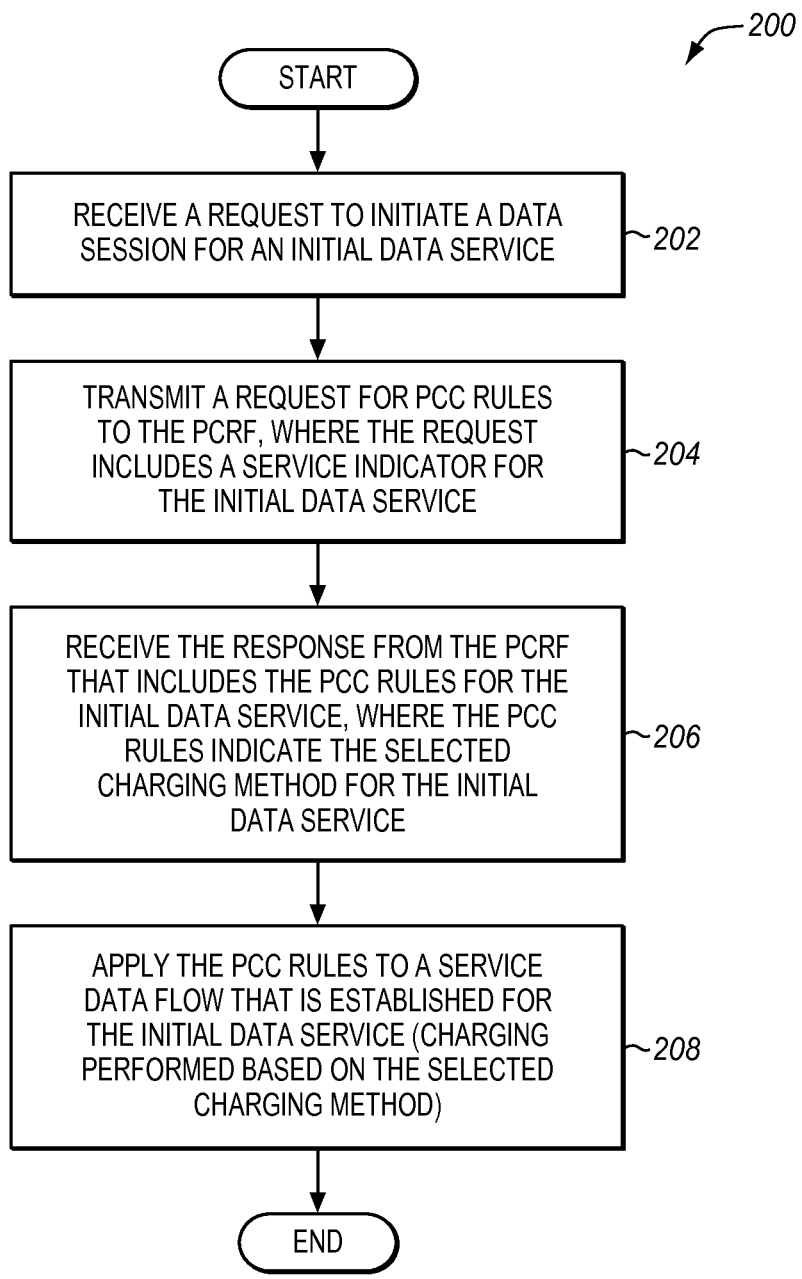
FIGS. 2-4 illustrate Policy and Charging Control (PCC) for an initial data service in an exemplary embodiment.
Figure 3:
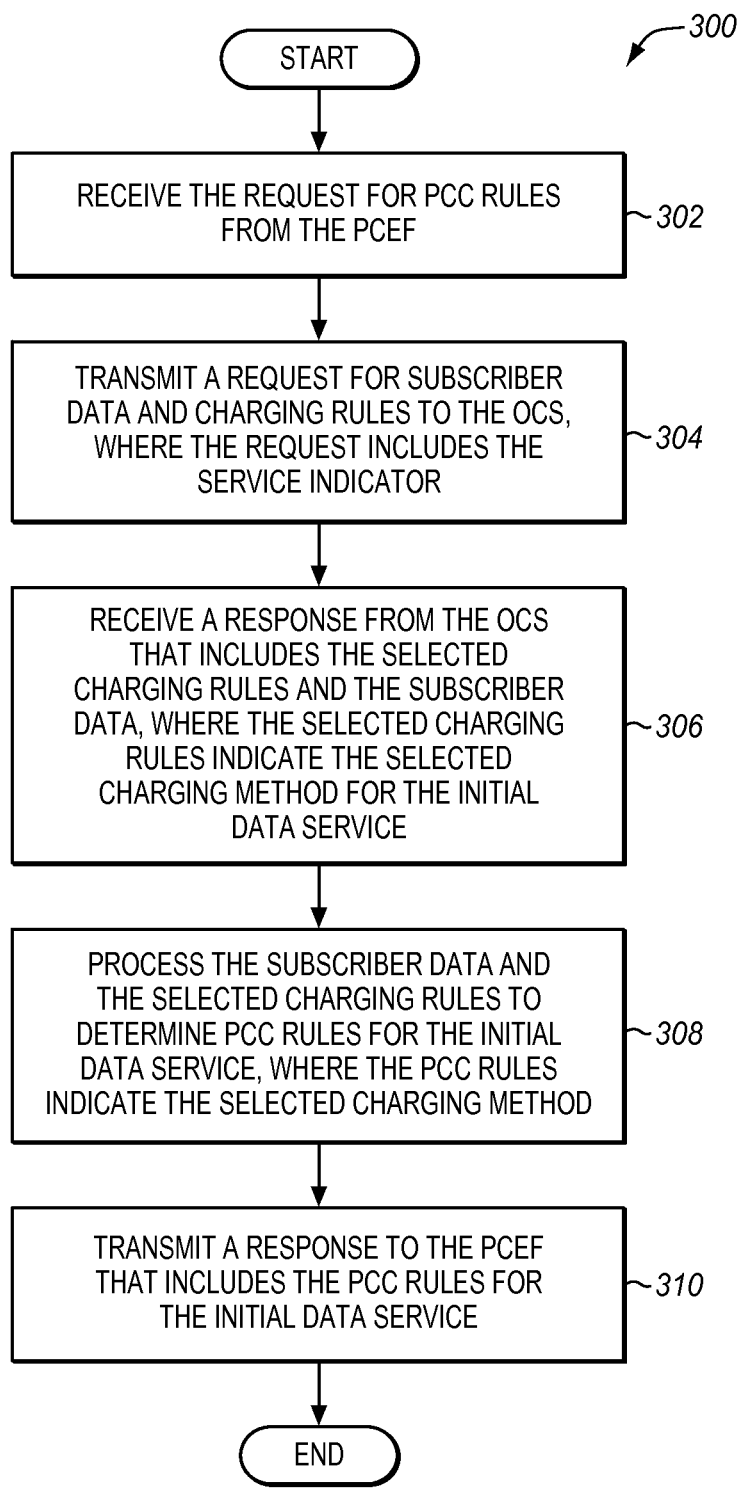
Figure 4:
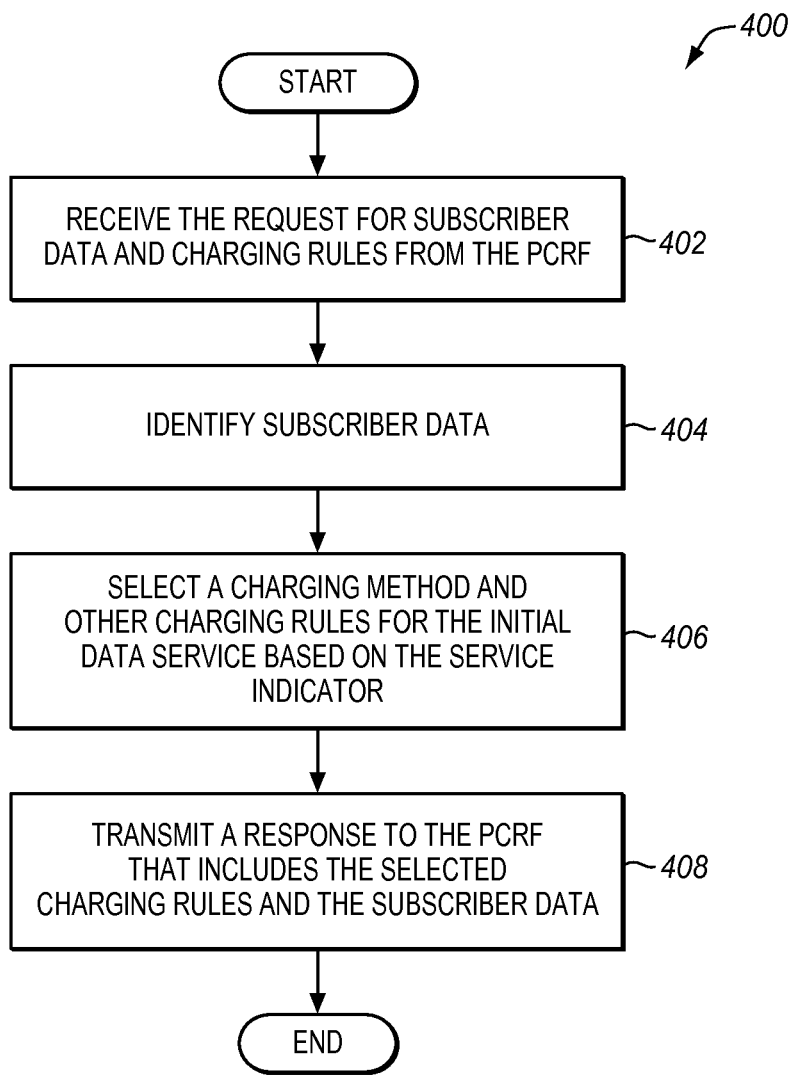

Assume for example that a mobile device 114 is able to access data services through RAN 110. RAN 110 comprises a wireless network (e.g., cellular network, WiFi network, etc) that communicates with mobile device 114 through wireless signals. RAN 110 may be a packet-based network that provides IP connectivity, such as an IP-CAN. In order to access a data service, mobile device 114 sends a request for a data session to RAN 110. The session request includes a description (e.g., SDP description) of an initial data service being requested. For example, if the initial data service is a VoIP call, then the session description will specify a VoIP call along with other session parameters. FIGS. 2-4 illustrate how Policy and Charging Control (PCC) is implemented for the initial data service in an exemplary embodiment.

FIG. 2 is a flow chart illustrating a method 200 performed in PCEF 122 in an exemplary embodiment. The steps of method 200 will be described with reference to PCC architecture 100 in FIG. 1, although method 200 may be performed in other networks or systems. The steps of the flow charts described herein are not all inclusive and may include other steps not shown. The steps may also be performed in an alternative order.

In step 202, PCEF 122 receives the request to initiate or establish a data session from mobile device 114. In response to the request, PCEF 122 transmits a request for PCC rules to PCRF 130 over the Gx reference point in step 204. For example, PCEF 122 may send a CC-Request to PCRF 130 with a CC-Request-Type AVP set to the value "INITIAL_REQUEST". The request for PCC rules may include a variety of data or parameters that may be used to make a PCC decision. For example, the request may include a subscriber ID (e.g., in a Subscription-Id AVP), the type of RAN connected to mobile device 114, the type of the radio access technology used for RAN 110, information on the external packet data network 112 (if available), the IP address of mobile device 114, etc. In this embodiment, the request for PCC rules further includes a service indicator. A service indicator comprises any data or information that designates or specifies a data service that has been requested. The Gx reference point may be expanded to include a new AVP defined for the service indicator, or the service indicator may be inserted in an existing AVP. The flow then goes to step 302 in FIG. 3.

FIG. 3 is a flow chart illustrating a method 300 performed in PCRF 130 in an exemplary embodiment. In step 302, PCRF 130 receives the request for PCC rules from PCEF 122 over the Gx reference point. PCRF 130 is tasked with making a PCC decision for the data session. Before making the PCC decision, PCRF 130 obtains information from OCS 150. Thus, PCRF 130 transmits a request for subscriber data and charging rules to OCS 150 in step 304 over the Sp reference point. The Sp reference point allows PCRF 130 to request subscription-related information based on a subscriber ID, a PDN identifier, and possibly other session attributes. For example, the subscriber ID may be an International Mobile Subscriber Identity (IMSI). In addition to this information, PCRF 130 inserts the service indicator in the request to OCS 150. The Sp reference point may be expanded to include a new AVP defined for the service indicator, or the service indicator may be inserted in an existing AVP. The flow then goes to step 402 in FIG. 4.

FIG. 4 is a flow chart illustrating a method 400 performed in OCS 150 in an exemplary embodiment. In step 402, SPSCM 154 receives the request from PCRF 130. SPSCM 154 processes the parameters in the request, such as the subscriber ID, and identifies subscriber data or subscriber-related data in step 404. For example, SPSCM 154 may search for a subscriber profile that matches the subscriber ID.

SPSCM 154 also processes the service indicator in the request to select a charging method and other charging rules for the initial data service in step 406. As stated above, SPSCM 154 stores charging rules that are defined for mobile device 114 in a rules engine. SPSCM 154 also stores service-based tariffs. When SPSCM 154 receives the request that includes the service indicator, SPSCM 154 associates the service indicator with a service-based tariff. SPSCM 154 may also process other information in identifying the tariff, such as location, time of day, account type, account balance levels, etc. SPSCM 154 also associates the service-based tariff with a charging method (online/offline) for the initial data service. Thus, SPSCM 154 is able to select a charging method based on the service indicator in the request. SPSCM 154 is in a good position to select the charging method because it stores the service-based tariffs that are not stored in other elements of the PCC architecture.

After selecting the charging method and other charging rules, SPSCM 154 transmits a response to PCRF 130 over the Sp reference point (in step 408) that includes the selected charging rules and the subscriber data. The Sp reference point may be expanded to include a new AVP defined for the selected charging method, or the selected charging method may be inserted in an existing AVP. The flow then returns to step 306 in FIG. 3.

In step 306, PCRF 130 receives the response from SPSCM 154. In step 308, PCRF 130 processes the subscriber data and the selected charging rules to determine or select PCC rules for the initial data service. In a PCC architecture, PCRF 130 has the responsibility of making PCC decisions. In this embodiment, OCS 150 has selected a charging method for the initial data service, along with other charging rules. PCRF 130 uses the charging method selected by OCS 150 when making the PCC rules decision. Thus, the PCC rules decision reflects the charging method selected by OCS 150. After making the PCC decision, PCRF 130 transmits a response to PCEF 122 that includes the PCC rules for the initial data service in step 310. The PCC rules include a rule name, a service ID, service data flow filter(s), precedence, gate status, QoS parameters, a charging key (i.e., rating group), and other charging parameters. The flow then returns to step 206 in FIG. 2.

In step 206, PCEF 122 receives the response from PCRF 130 that includes the PCC rules. PCEF 122 then applies the PCC rules to the data session in step 208. Applying the PCC rules is also referred to as enforcing the PCC decision. When applying the PCC rules, PCEF 122 enforces policy control through gate enforcement and QoS enforcement. PCEF 122 enforces charging control based on the charging method selected by OCS 150. For example, if OCS 150 selects online charging based on the service indicator, then PCEF 122 requests credit authorization from OCS 150 before establishing a service data flow for the initial data service. If the credit is authorized, then PCEF 122 establishes the service data flow for the initial data service, and enforces gate control and QoS control on the service data flow. If OCS 150 selects offline charging based on the service indicator, then PCEF 122 establishes the service data flow and collects charging information. PCEF 122 then interfaces with OFCS 160 and sends the offline charging information to OFCS 160.

Figure 5:
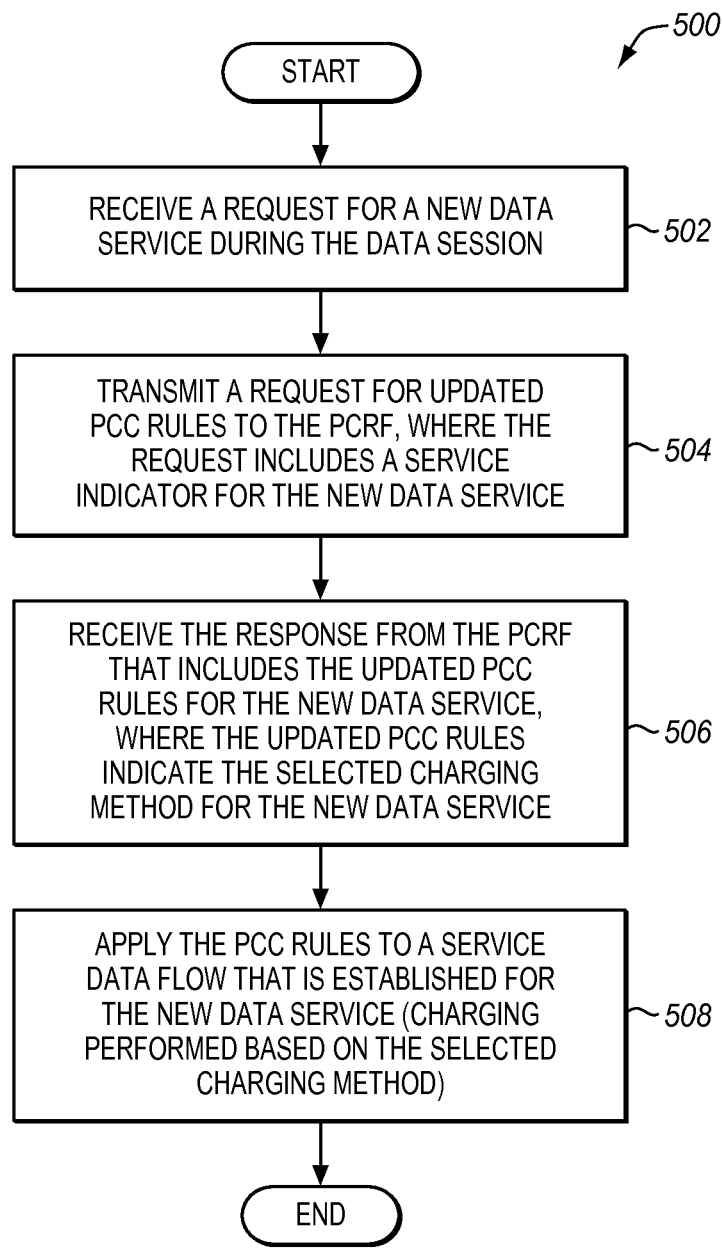
FIGS. 5-7 illustrate Policy and Charging Control (PCC) for a data service change in an exemplary embodiment.
Figure 6:
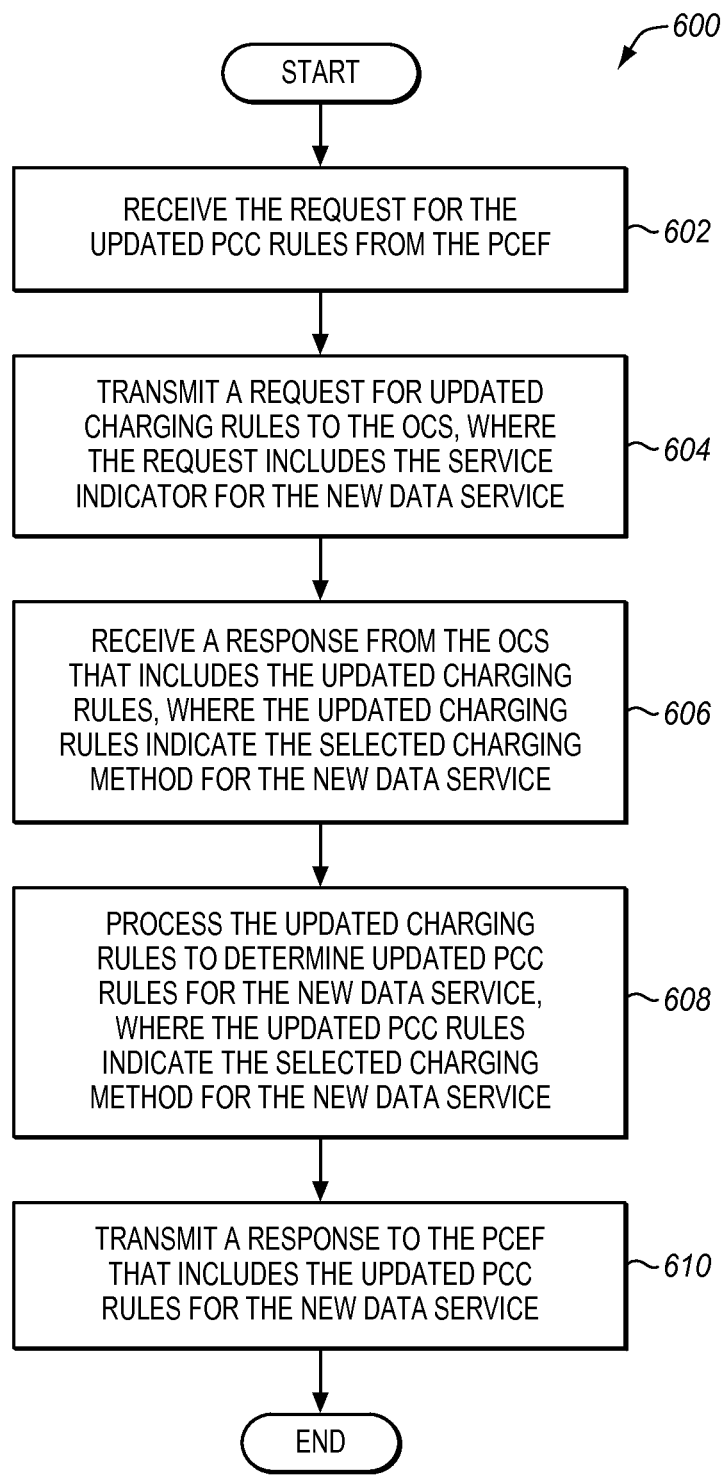
Figure 7:
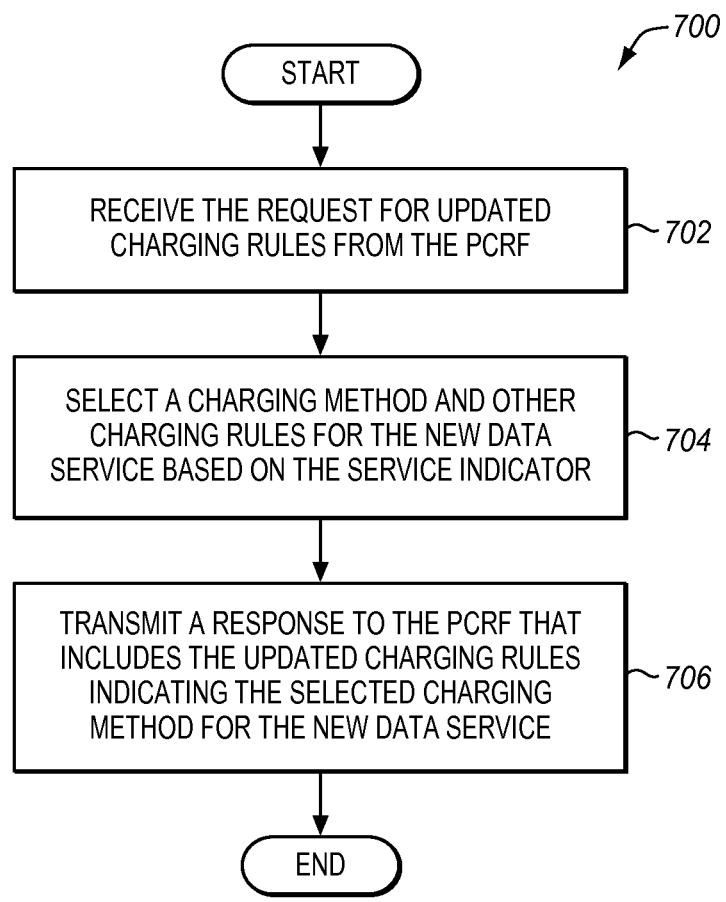
Figure 8:
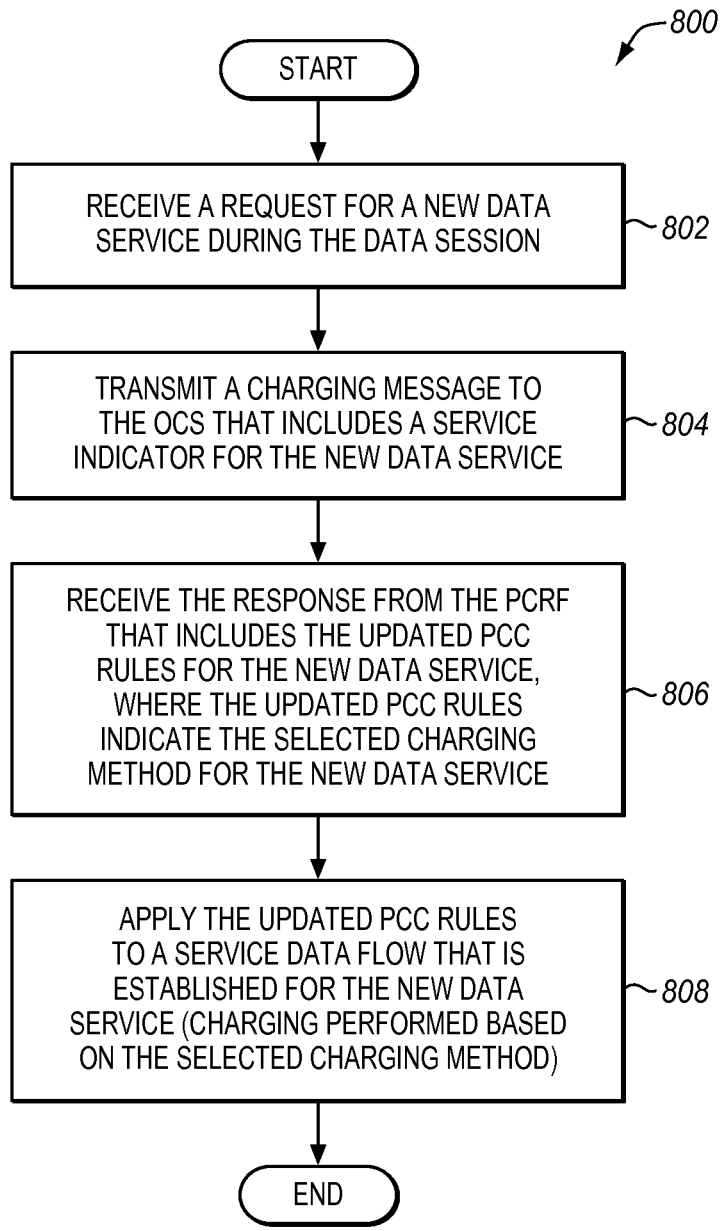
FIGS. 8-10 illustrate Policy and Charging Control (PCC) for a data service change in another exemplary embodiment.
Figure 9:
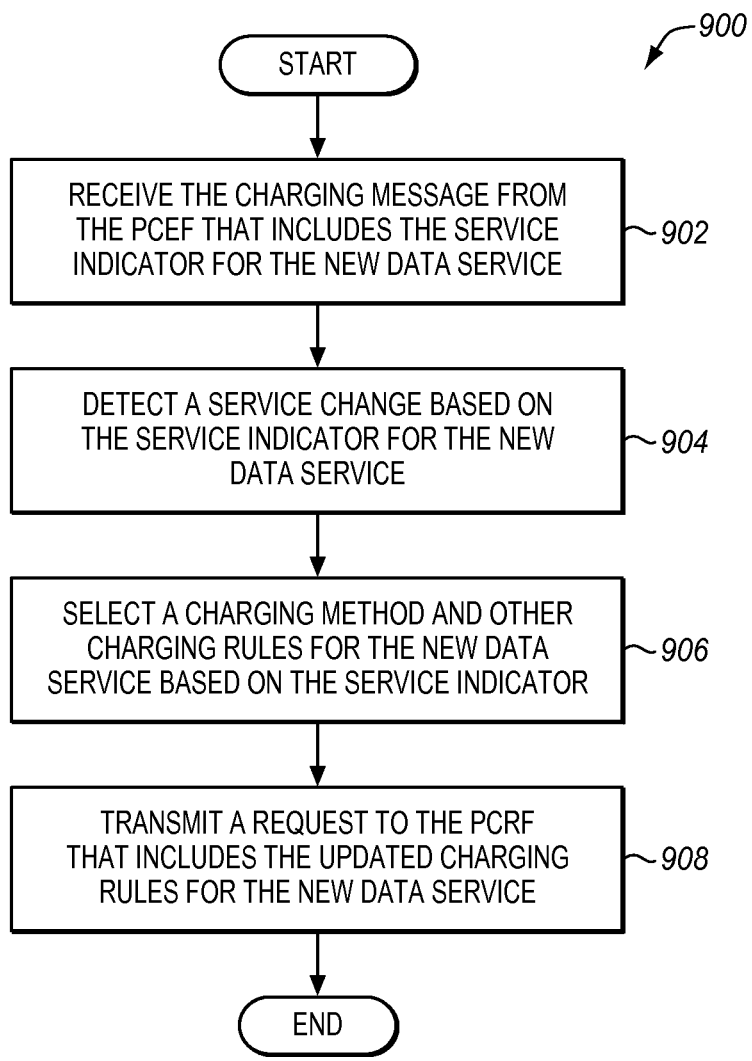
Figure 10:
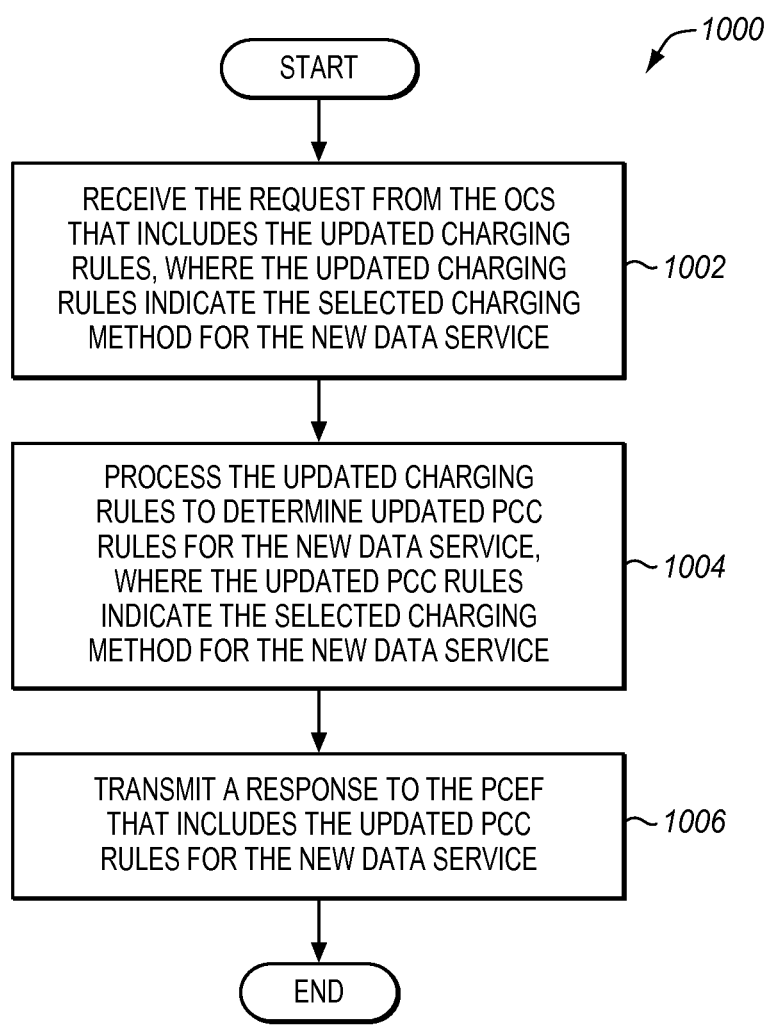

Assume that during the data session, an end user of mobile device 114 wants to request a new data service. For example, if the initial data service was a VoIP call, then the end user may request to change to or add online gaming during the same data session (e.g., same IP-CAN session). In this embodiment, updated charging rules (i.e., new charging method) may be selected for the new data service by OCS 150. Because OCS 150 selects charging rules based on a service indicator, OCS 150 is able to select charging rules for the new data service. There are two different ways of selecting charging rules for the new data service as described herein. The first is illustrated in FIGS. 5-7 where PCRF 130 requests updated charging rules from OCS 150 in response to PCEF 122 detecting a service change. The second is illustrated in FIGS. 8-10 where PCEF 122 sends a charging message to OCS 150 indicating a service change, and OCS 150 selects charging rules based on the service change and forces PCRF 130 to up-dated update the PCC rules over the Rx reference point.

FIG. 5 is a flow chart illustrating a method 500 performed in PCEF 122 in an exemplary embodiment. In step 502, PCEF 122 receives a request for a new data service from mobile device 114 during the data session. In response to the request for a new data service, PCEF 122 determines that new or updated PCC rules may be needed for the new data service. Thus, PCEF 122 transmits a request for updated PCC rules to PCRF 130 in step 504. For example, PCEF 122 may send a CC-Request to PCRF 130 with a CC-Request-Type AVP set to the value "UPDATE_REQUEST". The request for updated PCC rules includes a service indicator for the new data service, in addition to a variety of other parameters. The flow then goes to step 602 in FIG. 6.

FIG. 6 is a flow chart illustrating a method 600 performed in PCRF 130 in an exemplary embodiment. In step 602, PCRF 130 receives the request for updated PCC rules from PCEF 122. PCRF 130 has already obtained subscriber-related information for the end user of mobile device 114, so PCRF 130 may not need to request this information again. However, before making the PCC decision for the new data service, PCRF 130 obtains updated charging rules from OCS 150. Thus, PCRF 130 transmits a request for updated charging rules to OCS 150 in step 604 over the Sp reference point. PCRF 130 inserts a service indicator for the new data service in the request to OCS 150. The flow then goes to step 702 in FIG. 7.

FIG. 7 is a flow chart illustrating a method 700 performed in OCS 150 in an exemplary embodiment. In step 702, SPSCM 154 receives the request from PCRF 130. SPSCM 154 processes the service indicator in the request to select charging rules for the new data service in step 704. As part of selecting the charging rules, SPSCM 154 selects a charging method for a service data flow for the new data service. The charging method for the new data service may be different than the charging method for the initial data service. For example, the charging method for the initial data service may be online, while the charging method for the new data service may be offline. The service-driven charging rules allows for different types of charging methods for data services within the same data session.

After selecting the charging method and other charging rules for the new data service, SPSCM 154 transmits a response to PCRF 130 in step 706 that includes the updated charging rules. The flow then returns to step 606 in FIG. 6.

In step 606, PCRF 130 receives the response from SPSCM 154. In step 608, PCRF 130 processes the subscriber data and the selected charging rules to determine or select updated PCC rules for the new data service. PCRF 130 then transmits a response to PCEF 122 that includes the updated PCC rules for the new data service in step 610. The flow then returns to step 506 in FIG. 5.

In step 506, PCEF 122 receives the response from PCRF 130 that includes the updated PCC rules. PCEF 122 then applies the updated PCC rules to a service data flow established for the new data service in step 508. If the initial service data flow is still open for the initial data service, then PCEF 122 may apply the initial PCC rules to the initial service data flow and apply the updated PCC rules to the new service data flow. Thus, PCEF 122 may enforce different PCC rules (e.g., different charging methods) on service data flows of the same data session.

In the above embodiment of FIGS. 5-7, PCEF 122 requests updated PCC rules through PCRF 130. In an alternative embodiment, PCEF 122 may report a new service indicator to OCS 150, and then OCS 150 may force PCRF 130 to update the PCC rules over the Rx reference point. FIGS. 8-10 illustrate how OCS 150 may force a PCC rule change in response to a service change in an exemplary embodiment.

FIG. 8 is a flow chart illustrating a method 800 performed in PCEF 122 in an exemplary embodiment. In step 802, PCEF 122 receives a request for a new data service from mobile device 114 during the data session. One assumption at this point is that the charging method for the initial data service is online charging. Thus, PCEF 122 is exchanging online charging messages with OCS 150 for credit control. In response to the request for a new data service, PCEF 122 transmits a charging message to OCS 150. One example of a charging message is a Diameter Credit Control Request (CCR) [INITIAL, UPDATE, TERMINATE]. The charging message includes a service indicator for the new data service. The flow then goes to step 902 in FIG. 9.

FIG. 9 is a flow chart illustrating a method 900 performed in OCS 150 in an exemplary embodiment. In step 902, SDFCC 152 receives the charging message from PCEF 122. SDFCC 152 may process the charging message in a normal fashion to initiate credit control for the new data service. SDFCC 152 also detects that a service change is requested based on the service indicator for the new data service that is included in the charging message. Thus, SDFCC 152 forwards the charging message (or information from the charging message) to SPSCM 154. SPSCM 154 processes the service indicator in the charging message to select charging rules for the new data service in step 906. As part of selecting the charging rules, SPSCM 154 selects a charging method for a service data flow for the new data service. The charging method for the new data service may be different than the charging method for the initial data service.

SPSCM 154 then transmits a request to PCRF 130 that includes the updated charging rules over the Rx reference point in step 908. For example, the request may comprise a Diameter Authentication-Authorization-Request (AAR). The request from SPSCM 154 is to force PCRF 130 to re-evaluate the PCC decision based on the service change.

FIG. 10 is a flow chart illustrating a method 1000 performed in PCRF 130 in an exemplary embodiment. In step 1002, PCRF 130 receives the request from OCS 150 over the Rx reference point. In response to the request, PCRF 130 processes the subscriber data and the charging rules selected by OCS 150 to determine updated PCC rules for the new data service in step 1004. PCRF 130 then transmits a response to PCEF 122 that includes the updated PCC rules for the new data service in step 1006. The flow then returns to step 806 in FIG. 8.

In step 806, PCEF 122 receives the response from PCRF 130 that includes the updated PCC rules. PCEF 122 then applies the updated PCC rules to a service data flow established for the new data service in step 808. If the initial service data flow is still open for the initial data service, then PCEF 122 may apply the initial PCC rules to the initial service data flow and apply the updated PCC rules to the new service data flow. Thus, PCEF 122 may enforce different PCC rules (e.g., different charging methods) on service data flows of the same data session.

If PCEF 122 receives another request for a new data service, then PCEF 122 may request updated PCC rules yet again from PCRF 130 (see FIGS. 5-7) or from OCS 150 (see FIGS. 8-10). Because the charging rules (e.g., charging method) are selected based on the data service that was requested, the charging rules may change as the data services change. Because of this, charging is more flexible during a data session. For example, one data service may be charged as prepaid to Account A, while a second data service may be charged as postpaid to Account B. During the same data session, two different data services may be charged via different charging methods (accounts) which was not possible under the 3GPP PCC architecture.

EXAMPLE

Figure 11:
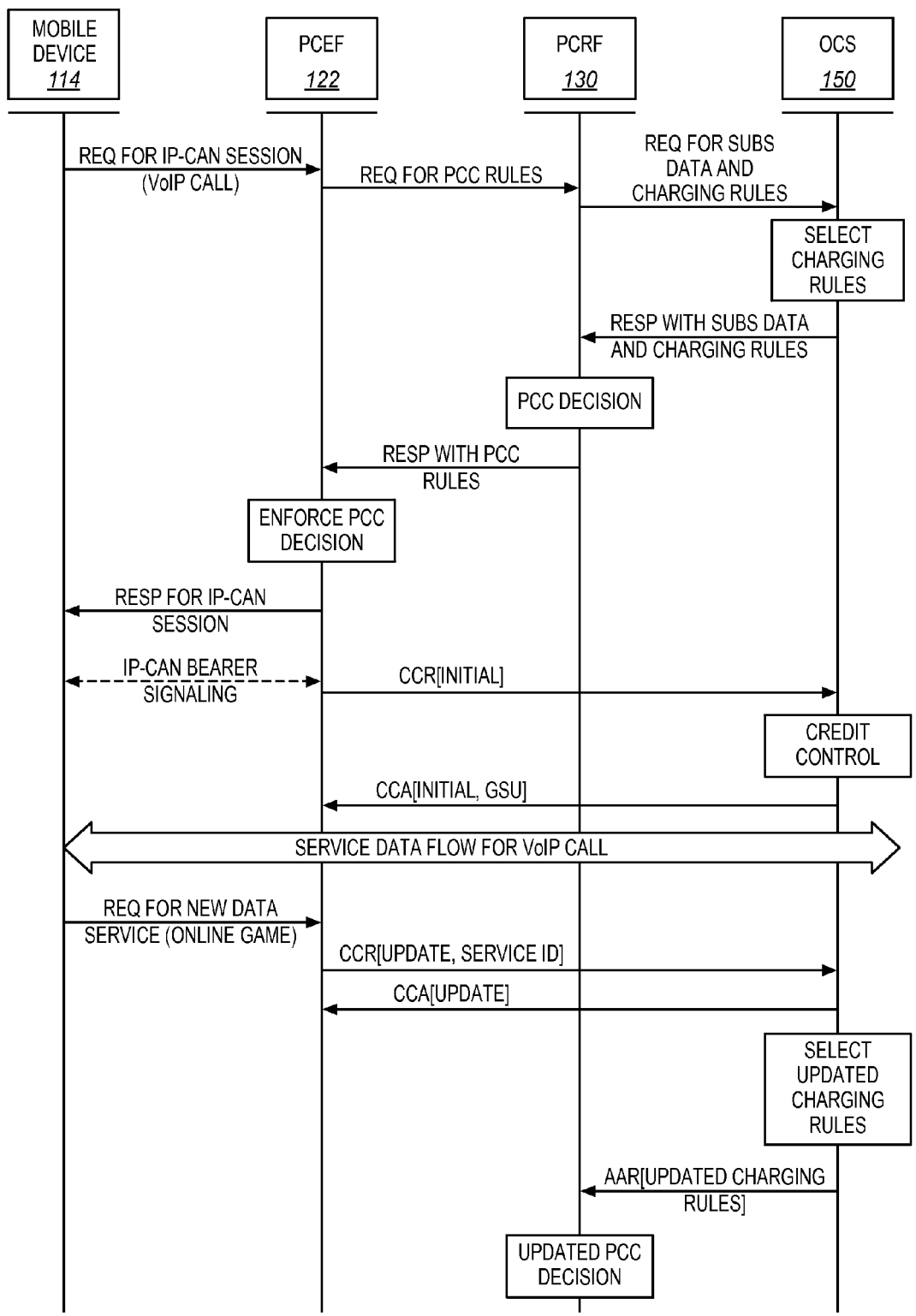
FIGS. 11-12 are message diagrams illustrating an example of selecting charging methods based on a service indicator.
Figure 12:
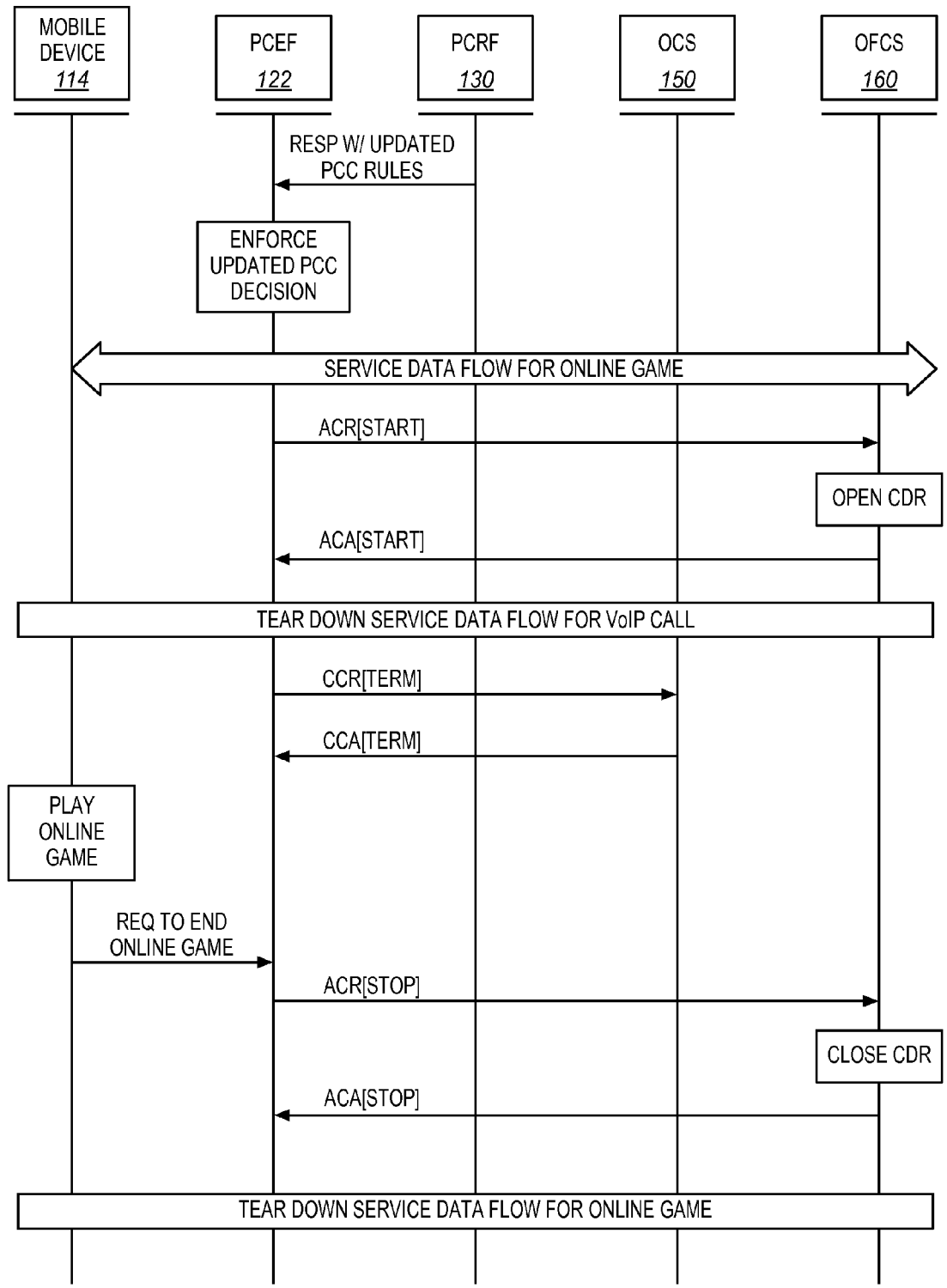

FIGS. 11-12 are message diagrams illustrating an example of selecting charging methods based on a service indicator. The message diagrams illustrate Diameter messaging used within PCC architecture 100. To start in FIG. 11, mobile device 114 exchanges messages with PCEF 122 to request an IP-CAN session. For example, mobile device 114 may send a SIP message, such as a SIP INVITE, to request the IP-CAN session. The request from mobile device 114 includes a session description of a desired data service. In this example, assume that the initial data service requested by the end user of mobile device 114 is a VoIP call.

PCEF 122 receives the request to establish the IP-CAN session, and transmits a request for PCC rules to PCRF 130 over the Gx reference point. The request for PCC rules may include a variety of data or parameters that may be used to make a PCC decision. For example, the request may include a subscriber ID (e.g., in a Subscription-Id AVP), the type of RAN connected to mobile device 114, the type of the radio access technology used for RAN 110, information on the external packet data network 112 (if available), the IP address of mobile device 114, etc. In this embodiment, the request for PCC rules further includes a service indicator for the initial data service (e.g., a service indicator for a VoIP call).

PCRF 130 receives the request for PCC rules from PCEF 122. PCRF 130 is charged with making a PCC decision for the data session. Before making the PCC decision, PCRF 130 obtains information from OCS 150. Thus, PCRF 130 transmits a request for subscriber data and charging rules to OCS 150 over the Sp reference point. The request from PCRF 130 includes the service indicator for the VoIP call.

OCS 150 receives the request from PCRF 130. SPSCM 154 in OCS 150 (see FIG. 1) processes the parameters in the request, such as the subscriber ID, and identifies subscriber data or subscriber-related data. For example, SPSCM 154 may search for a subscriber profile that matches the subscriber ID. SPSCM 154 also processes the service indicator in the request to select charging rules for the VoIP call, and in particular, to select a charging method for the VoIP call. For example, SPSCM 154 stores a tariff for VoIP calls that is indexed with a service indicator for VoIP calls. Thus, when SPSCM 154 receives the request from PCRF 130 that includes the service indicator, SPSCM 154 is able to identify the tariff for the VoIP call, and the charging method (online/offline) associated with the tariff. For this embodiment, assume that the charging method for VoIP calls is online charging to Account A.

After selecting the charging method (online) and other charging rules, SPSCM 154 transmits a response to PCRF 130 that includes the selected charging rules and the subscriber data. PCRF 130 receives the response from SPSCM 154, and processes the subscriber data and the selected charging rules to make a PCC decision for the VoIP call. PCRF 130 then transmits a response to PCEF 122 that includes the PCC rules resulting from the PCC decision. PCEF 122 sends a response to mobile device 114 for establishing the IP-CAN session. This may include exchanging further signaling with mobile device 114.

PCEF 122 then applies the PCC rules to the data session. When applying the PCC rules, PCEF 122 enforces charging control based on the charging method selected by OCS 150. Because the charging method comprises online charging for the VoIP call, PCEF 122 needs to request authorization from OCS 150 before a service data flow may be established for the VoIP call. Thus, PCEF 122 transmits a Diameter Credit Control Request (CCR)[INITIAL] to OCS 150 over the Diameter Gy reference point. SDFCC 152 in OCS 150 (see FIG. 1) receives the CCR, and identifies an account balance for the end user of mobile device 114 based on a subscriber ID in the CCR. SDFCC 152 rates the VoIP call and performs credit control based on an account balance of the end user. If the account balance for the end user is too low, then SDFCC 152 may reject the reservation request. However, if the account balance is sufficient, then SDFCC 152 grants a quota of service units based on the rating and the account balance. SDFCC 152 then inserts the granted service units (GSU) in a Diameter Credit Control Answer (CCA)[INITIAL], and transmits the CCA[INITIAL] to PCEF 122.

With credit granted by OCS 150, PCEF 122 may allow a service data flow for the VoIP call to begin (i.e., the end user of mobile device 114 is then able to converse with another party). With the service data flow initiated, PCEF 122 enforces policy control through gate enforcement and QoS enforcement. PCEF 122 also monitors the usage of mobile device 114 (e.g., the number of bytes received/transmitted) and decrements the granted quota of service units accordingly. If the granted quota is consumed, then PCEF 122 may request another quota from OCS 150 by sending a CCR [UPDATE].

Assume at some point that mobile device 114 sends a request to change from a VoIP call to an online game. PCEF 122 receives the request from the mobile device 114, and detects that a service change has been requested by mobile device 114. PCEF 122 then transmits a CCR[UPDATE] to OCS 150 that includes a service indicator for the new data service, which is online gaming.

SDFCC 152 in OCS 150 (see FIG. 1) receives the CCR [UPDATE] from PCEF 122. SDFCC 152 may process the charging message in a normal fashion for credit control. SDFCC 152 also detects that a service change is requested based on the service indicator for online gaming that is included in the CCR. Thus, SDFCC 152 forwards the CCR (or information from the CCR) to SPSCM 154. SPSCM 154 processes the service indicator in the CCR to select charging rules for online gaming. As part of selecting the charging rules, SPSCM 154 selects a charging method for a service data flow for online gaming. For example, SPSCM 154 stores a tariff for online gaming that is indexed with a service indicator. Thus, when SPSCM 154 receives the CCR from PCEF 122 that includes the service indicator, SPSCM 154 is able to identify the tariff for online gaming, and the charging method (online/offline) associated with the tariff. For this embodiment, assume that the charging method for online gaming is offline charging to Account B.

After selecting the charging method (offline) and other charging rules, SPSCM 154 transmits a Diameter Authentication-Authorization-Request (AAR) to PCRF 130 that includes the updated charging rules. The request from SPSCM 154 is to force PCRF 130 to re-evaluate the PCC decision based on the service change. In response to the AAR, PCRF 130 processes the subscriber data and the updated charging rules to determine updated PCC rules for online gaming. This is referred to as an updated PCC decision.

In FIG. 12, PCRF 130 transmits a response to PCEF 122 that includes the updated PCC rules for online gaming. PCEF 122 then applies or enforces the updated PCC rules to a service data flow established for online gaming. When applying the updated PCC rules, PCEF 122 enforces charging control based on the charging method selected by OCS 150. Because the charging method is offline for online gaming, PCEF 122 does not need to request authorization from OFCS 160 before a service data flow may be established. Thus, PCEF 122 initiates the service data flow for the online game, and enforces policy control through gate enforcement and QoS enforcement.

PCEF 122 also transmits an Accounting Request (ACR) [START] to OFCS 160 when the service data flow begins. In response to the ACR[START], OFCS 160 opens a Charging Data Record (CDR) for the service data flow, and responds to PCEF 122 with an Accounting Answer (ACA) [START]. As the service data flow continues, PCEF 122 monitors the usage of mobile device 114 (e.g., the number of bytes received/transmitted) and periodically reports the usage to OFCS 160 in ACR[INTERIM] messages (not shown in FIG. 12).

With the service data flow established for the online game, PCEF 122 tears down the service data flow for the VoIP call. PCEF 122 also sends a CCR[TERMINATION] to OCS 150 indicating any unused service units for the call. OCS 150 responds back to PCEF 122 with a CCA[TERMINATION].

If the service data flow for the online game ends, then PCEF 122 sends an ACR[STOP] to OFCS 160 with offline charging information. In response to the ACR, OFCS 160 closes the CDR, and sends an ACA[STOP] back to PCEF 122. OFCS 160 may then send the CDR to a billing system for processing (not shown in FIG. 12).

This embodiment shows the flexibility in charging when the charging rules are selected based on the data service that is requested. When the end user of mobile device 114 requests a VoIP call, the VoIP call may be charged online to Account A. Account A may belong to the employer of the end user. When the end user of mobile device 114 switches over to online gaming, the online game may be charged offline to Account B. Account B may belong to the end user, so that the employer is not charged for online gaming but is charged for VoIP calls. This type of flexibility is not available in the 3GPP standards. According to the standards, when a data session (IP-CAN session) is established, the charging method is selected based on subscriber-related data. The charging method remains the same for the length of the data session even if there is a service change during the session. By selecting charging rules according to the data service being requested, the embodiments herein allow for charging methods to change during a data session.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A Policy and Charging Control (PCC) architecture, comprising:
   an online charging system (OCS) operable to store service-based tariffs that are associated with service indicators for data services;
   the OCS is further operable to receive a request for charging rules for an initial data service from a Policy and Charging Rules Function (PCRF), wherein the request includes a service indicator for the initial data service;
   the OCS is further operable to identify a service-based tariff based on the service indicator for the initial data service, to select between an online or offline charging method for the initial data service based on the service-based tariff associated with the service indicator, and to transmit a response to the PCRF that includes the charging method selected for the initial data service.

2. The PCC architecture of claim 1 further comprising:
   the PCRF operable to determine PCC rules for the initial data service based on the charging method selected by the OCS, and to transmit a response to a Policy and Charging Enforcement Function (PCEF) that includes the PCC rules for the initial data service, wherein the PCC rules include the charging method selected by the OCS; and
   the PCEF operable to enforce the charging method selected by the OCS on a service data flow for the initial data service.

3. The PCC architecture of claim 1 wherein:
   the OCS is further operable to receive a request for updated charging rules from the PCRF responsive to a service change, wherein the request includes another service indicator for a new data service; and
   the OCS is further operable to identify a service-based tariff based on the other service indicator for the new data service, to select between the online or offline charging method for the new data service based on the service-based tariff associated with the other service indicator, and to transmit a response to the PCRF that includes the charging method selected for the new data service.

4. The PCC architecture of claim 1 wherein:
   the OCS is further operable to receive a charging request from a Policy and Charging Enforcement Function (PCEF) responsive to a service change, wherein the charging request includes another service indicator for a new data service; and
   the OCS is further operable to identify a service-based tariff based on the other service indicator for the new data service, to select between the online or offline charging method for the new data service based on the service-based tariff associated with the other service indicator, and to transmit a request to the PCRF that includes the charging method selected for the new data service, wherein the request forces the PCRF to update PCC rules based on the charging method for the new data service.

5. The PCC architecture of claim 4 wherein:
   the OCS is operable to communicate with the PCRF over a Diameter Rx reference point; and
   the Diameter Rx reference point is expanded to include a new AVP for the charging method for the new data service.

6. The PCC architecture of claim 1 wherein:
   the OCS is operable to communicate with the PCRF over a Diameter Sp reference point; and
   the Diameter Sp reference point is expanded to include a new AVP for the service indicator.

7. The PCC architecture of claim 6 wherein:
   the Diameter Sp reference point is expanded to include a new AVP for the charging method for the initial data service.

8. A method of performing Policy and Charging Control (PCC), the method comprising:
   storing service-based tariffs that are associated with service indicators for data services in an online charging system (OCS);
   receiving a request for charging rules for an initial data service in the OCS from a Policy and Charging Rules Function (PCRF), wherein the request includes a service indicator for the initial data service;
   identifying a service-based tariff based on the service indicator for the initial data service;
   selecting between an online or offline charging method for the initial data service in the OCS based on the service-based tariff associated with the service indicator; and
   transmitting a response from the OCS to the PCRF that includes the charging method selected for the initial data service.

9. The method of claim 8 further comprising:
   determining PCC rules for the initial data service in the PCRF based on the charging method selected by the OCS;
   transmitting a response to a Policy and Charging Enforcement Function (PCEF) that includes the PCC rules for the initial data service, where the PCC rules include the charging method selected by the OCS; and
   enforcing the charging method selected by the OCS on a service data flow for the initial data service in the PCEF.

10. The method of claim 8 further comprising:
receiving a request for updated charging rules in the OCS from the PCRF responsive to a service change, wherein the request includes another service indicator for a new data service;
identifying a service-based tariff based on the other service indicator for the new data service;
selecting between the online or offline charging method for the new data service in the OCS based on the service-based tariff associated with the other service indicator; and
transmitting a response from the OCS to the PCRF that includes the charging method selected for the new data service.

11. The method of claim 8 further comprising:
receiving a charging request in the OCS from a Policy and Charging Enforcement Function (PCEF) responsive to a service change, wherein the charging request includes another service indicator for a new data service;
identifying a service-based tariff based on the other service indicator for the new data service;
selecting between the online or offline charging method for the new data service in the OCS based on the service-based tariff associated with the other service indicator; and
transmitting a request from the OCS to the PCRF that includes the charging method selected for the new data service, wherein the request forces the PCRF to update PCC rules based on the charging method for the new data service.

12. The method of claim 11 wherein:
the OCS communicates with the PCRF over a Diameter Rx reference point; and
the Diameter Rx reference point is expanded to include a new AVP for the charging method for the new data service.

13. The method of claim 8 wherein:
the OCS communicates with the PCRF over a Diameter Sp reference point; and
the Diameter Sp reference point is expanded to include a new AVP for the service indicator.

14. The method of claim 13 wherein:
the Diameter Sp reference point is expanded to include a new AVP for the charging method for the initial data service.

15. An Online Charging System (OCS), comprising:
a Service Data Flow based Credit Control (SDFCC) function operable to perform online credit control functions; and
a Subscriber Profile and Service Control Management (SPSCM) function operable to store service-based tariffs that are associated with service indicators for data services, to receive a request for charging rules for an initial data service from a Policy and Charging Rules Function (PCRF), wherein the request includes a service indicator for the initial data service;
the SPSCM function further operable to identify a service-based tariff based on the service indicator for the initial data service, to select between an online or offline charging method for the initial data service based on the service-based tariff associated with the service indicator, and to transmit a response to the PCRF that includes the charging method selected for the initial data service.

16. The OCS of claim 15 wherein:
the SPSCM function is further operable to receive a request for updated charging rules from the PCRF responsive to a service change, wherein the request for updated charging rules includes another service indicator for a new data service; and
the SPSCM function is further operable to identify a service-based tariff based on the other service indicator for the new data service, to select between the online or offline charging method for the new data service based on the service-based tariff associated with the other service indicator, and to transmit a response to the PCRF that includes the charging method selected for the new data service.

17. The OCS of claim 15 wherein:
the SPSCM function is further operable to receive a charging request from a Policy and Charging Enforcement Function (PCEF) responsive to a service change, wherein the charging request includes another service indicator for a new data service; and
the SPSCM function is further operable to identify a service-based tariff based on the other service indicator for the new data service, to select between the online or offline charging method for the new data service based on the service-based tariff associated with the other service indicator, and to transmit an update request to the PCRF that includes the charging method selected for the new data service, wherein the update request forces the PCRF to update PCC rules based on the charging method for the new data service.

18. The OCS of claim 17 wherein:
the update request comprises a Diameter Rx Authentication-Authorization-Request (AAR) that includes an AVP defined for the charging method.

* * * * *